Oct. 24, 1967 C. F. STEARNS 3,348,560
ACCELERATION FORCE COMPENSATOR FOR AIRCRAFT PRIME MOVER
Original Filed April 29, 1964 2 Sheets-Sheet 1
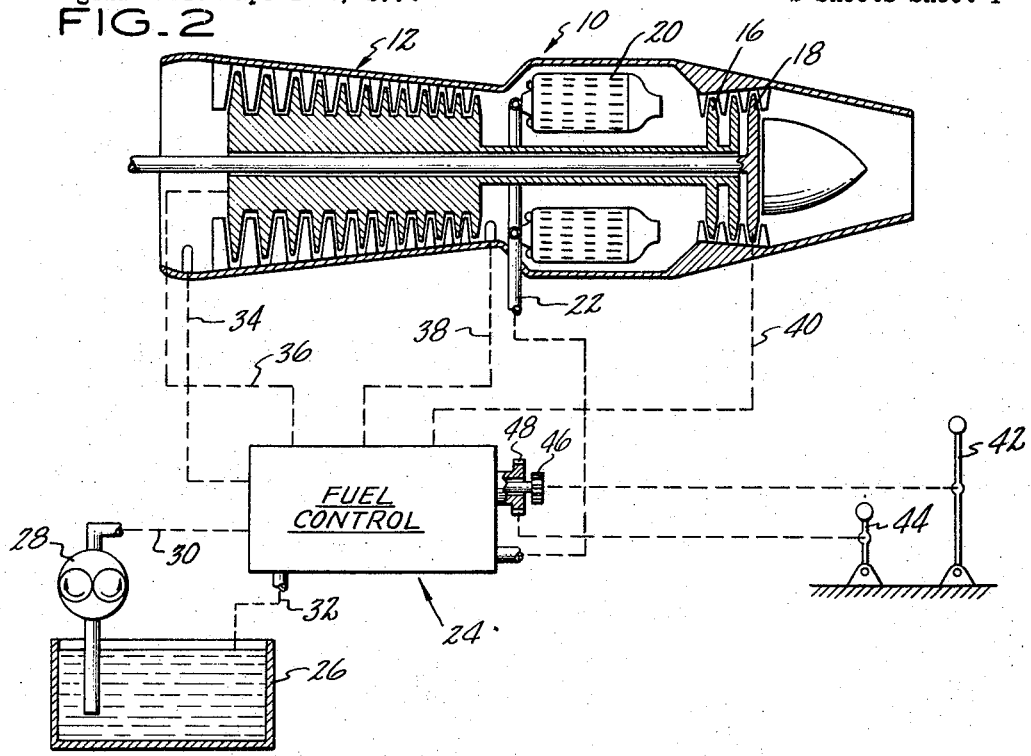
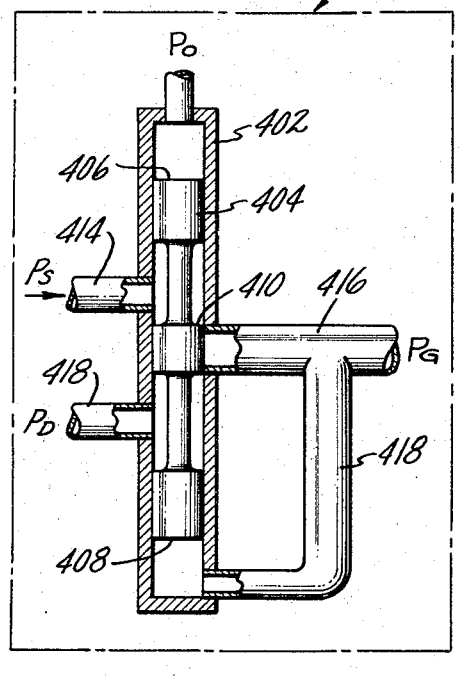
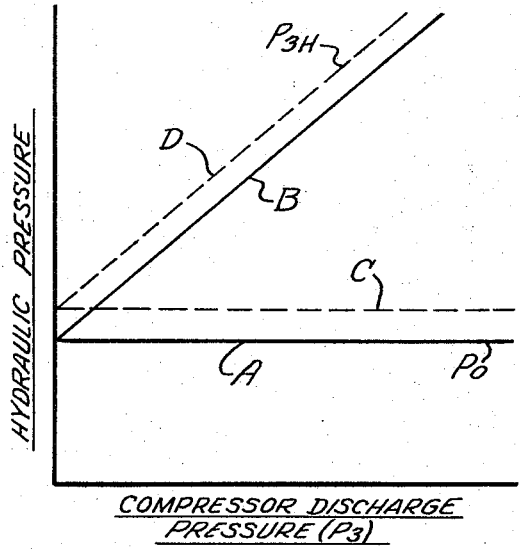
INVENTOR
CHARLES F. STEARNS
BY Norman Friedland
ATTORNEY

United States Patent Office 3,348,560
Patented Oct. 24, 1967

3,348,560
ACCELERATION FORCE COMPENSATOR FOR
AIRCRAFT PRIME MOVER
Charles F. Stearns, East Longmeadow, Mass., assignor to
United Aircraft Corporation, East Hartford, Conn., a
corporation of Delaware
Continuation of application Ser. No. 363,577, Apr. 29,
1964. This application Feb. 21, 1967, Ser. No. 617,713
7 Claims. (Cl. 137—38)

ABSTRACT OF THE DISCLOSURE

A valve which may be remotely mounted carries a variable volume fluid filled chamber to position a metering land to admit fluid to or conduct fluid away from a servo control valve to compensate for G loadings.

This application is a continuation of my copending application, Ser. No. 363,577, filed Apr. 29, 1964, for Acceleration Force Compensator.

This invention relates to fuel controls for turbine type of power plants adapted to propel aircraft and particularly to means for compensating for G loads attendant the maneuvering of the aircraft.

It is an object of this invention to provide mechanism to compensate for G loadings felt by various valves in a fuel control for a turbine type of power plant adapted to propel aircraft.

A still further object of this invention is to provide means for developing a pressure which is equal or proportional to the G loadings imposed upon the various valves and computting mechanisms of a fuel control for a turbine type of power plant adapted to propel aircraft.

It still is a further object of this invention to provide G loading compensating means which is characterized as being simple to manufacture, economical to manufacture, reliable and yet capable of rugged use.

Other features and advantages will be apparent from the specification and claims and from the accompanying drawings which illustrate an embodiment of the invention.

FIG. 1 is a graphical representation showing a hydraulic pressure plotted against sensed compressor discharge pressure to illustrate the effect of G loadings on the various valves in a control.

FIG. 2 is a schematic illustration showing a fuel control connected to a power plant.

FIG. 4 is a schematic illustration showing the details of my invention.

Figure 3:
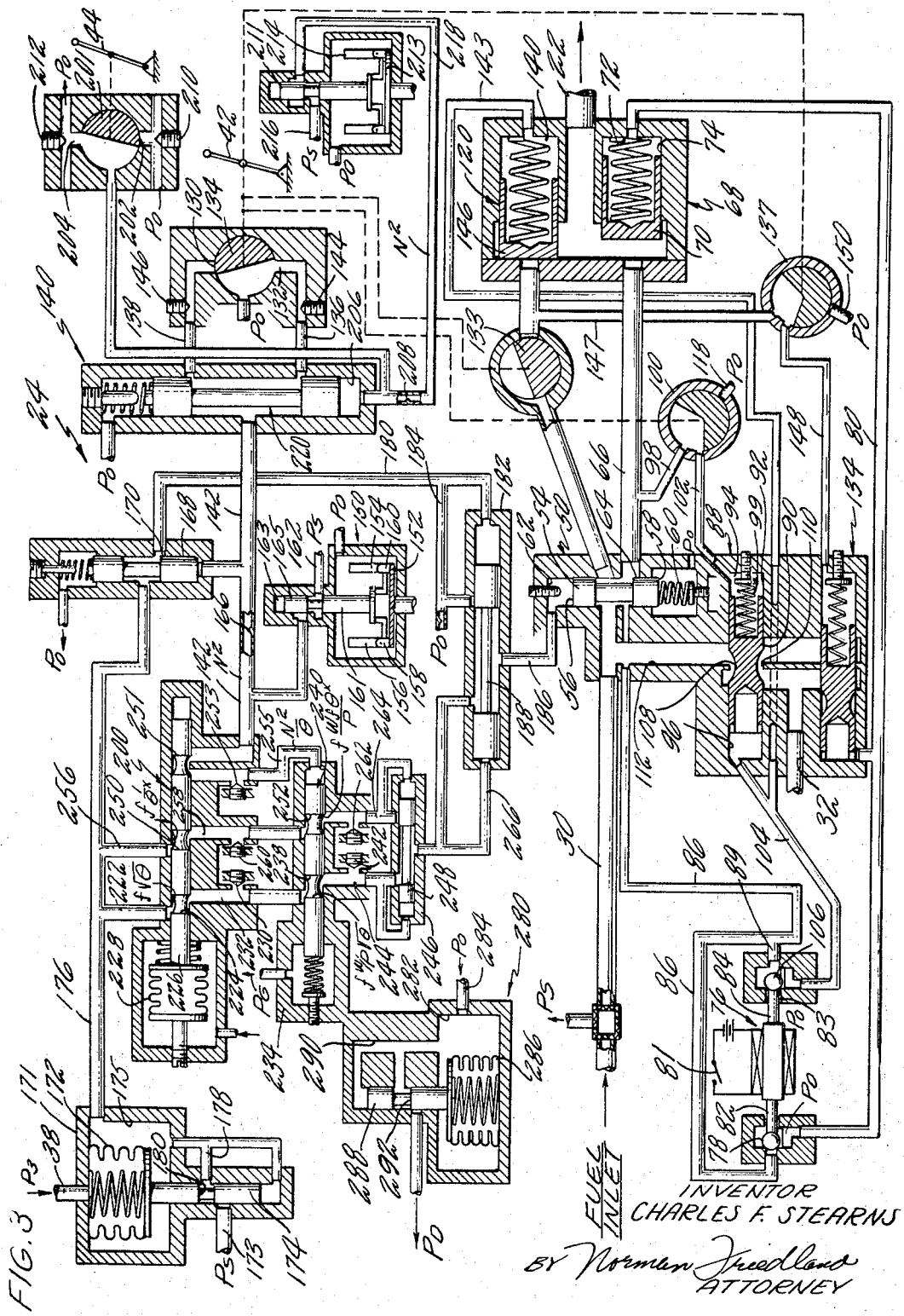
FIG. 3 is a schematic illustration of a fuel control which may incorporate my invention.

FIG. 1 is included in this specification to demonstrate the effect that G loadings have on a hydraulic type of fuel control. An example where this invention has particular utility may be had by referring to my application bearing the U.S. Ser. No. 337,904 filed on Jan. 15, 1964, and assigned to the same assignee. As shown in the aforementioned patent application, the referenced pressure sensed in the throttle valve and all the computing valves of the hydraulic fuel control is generated by the absolute pressure control. A like control is also shown in FIG. 3 of this application. This mechanism serves to produce a constant reference pressure.

As noted in FIG. 1, the drain pressure (Po) shown by solid line A, is held constant and the hydraulic pressure generated by the compressor discharge pressure control varies as shown by the solid line B. The effect of G loading is illustrated by the broken lines C and D wherein it is noted that the hydraulic pressure as a result of G loadings seeks a new level. It will be appreciated that the throttle valve feels the reference pressure (Po) and a computed pressure which bears some relationship to the compressor discharge pressure signal. As noted from FIG. 1, the hydraulic Po pressure and hydraulic compressor discharge pressure shifts a like amount at a given compressor discharge pressure so that the pressure drop between the two remains constant. This pressure drop is evidenced at the throttle valve in a sense tending to hold it in place. However, since the same G loadings are imposed on the throttle valve, it would shift in proportion thereto without G loading compensation. Thus, the G loading compensator, as disclosed in this present invention, serves to prevent the throttle valve from moving as a result of an attendant G loading condition by developing a pressure, equal and opposite, to the G loading felt by the throttle valve.

When the following description describes a preferred embodiment of a hydraulic fuel control which incorporates the present invention, it is to be understood that the present invention is not intended to be limited thereto. It is pointed out here that the G loading is defined as an acceleration equal to the acceleration of gravity used as a unit of measurement for bodies undergoing acceleration.

Referring now to FIG. 2 which shows a gas turbine engine generally illustrated by numeral 10 as having a compressor section 12 being driven by turbine section 16. Since the turbine 16 is connected to compressor 12 for driving the same, it is generally referred to as the gas generator turbine and the rotational speed thereof is hereinafter referred to as $N_g$. Turbine 18 illustrates a free turbine which may be adapted to drive a variable load such as a helicopter rotor, propeller and the like. Since turbine 18 is mechanically disconnected from turbine 16 but is driven by the discharging gases thereof and because it is free or has only an aerodynamic connection with the turbines in the first turbine section, it is generally referred to as the free turbine and the speed thereof is hereinafter referred to as $N_f$. Interposed between the compressor section and the turbine section is the burner section generally indicated by numeral 20. Fuel is injected into the burner section through the fuel manifold 22 which is regulated by the fuel metering section generally indicated by numeral 24 to be described hereinbelow.

Basically, the fuel metering system of the fuel control serves to meter fuel to the engine in an amount commensurate with optimum engine operations while assuring that malfunctions due to surge, overtemperature or rich or lean blow out do not ensue. Fuel is fed to fuel control 24 from reservoir 26 and the pressure thereof is increased by virtue of pump 28 through line 30. The fuel control also contains a drain manifold which discharges excessive fuel or ported fuel to drain via line 32.

The fuel control also contains a computing system which measures certain parameters, computes them in accordance with the control parameters indicated in the above for controlling the fuel metering system. For this purpose, compressor inlet temperature is sensed via line 34, compressor speed ($N_g$) is sensed via line 36, compressor discharge pressure ($P_{t3}$) is sensed via line 38 and free turbine speed ($N_f$) is sensed via line 40. It is to be understood that any suitable mechanism for sensing these various operating conditions of the engine is contemplated within the scope of this invention. Power levers 42 and 44 are suitably situated in the cabin of the aircraft and are available to the pilot for setting the speed of the gas generator and the speed of the free turbine in a manner to be described hereinbelow. These control levers also serve to operate various other mechanically movable parts in the fuel control, also to be described hereinbelow. Thus, lever 42 rotates gear 46 which rotates the connecting shaft and lever 44 rotates gear 48 which rotates its connecting rotary shaft.

While the fuel control showing the preferred embodiment is illustrated in connection with a free turbine type of gas turbine engine, it is to be understood that this invention has applications as will become obvious to one skilled in the art in connection with all types of gas turbine engines. As is known in this art, the free turbine can operate at a different speed than the gas generator. By virtue of this fact, it is often desirable to measure $N_f$ as well as $N_g$. If, however, it is desirable to utilize this invention in connection with a solid shaft or a coupled type of gas turbine engine, it would only be necessary to sense the speed of one of the rotating mechanisms within the engine. In this event, the free turbine speed sensor which will be described hereinbelow would not be utilized.

It is also to be understood and will be obvious to one skilled in the art that the terminology of power lever is not particularly limited to the particular lever in the cockpit of the aircraft. Rather, it is intended to cover any linkage connecting the cockpit to the fuel control whether it be referred to as a "go handle," "power lever" or "throttle lever" or the like.

Now referring to FIG. 3 which is a schematic illustration of a fuel control designated by numeral 24 as having both a fuel metering system and a computing system. Fuel is admitted to the throttle valve generally indicated by numeral 50 via inlet or supply line 30. Throttle valve 50 comprises spool 54 having a fluid reaction end 56 and a combined pressure and a spring reaction end 58. Adjustable spring 60 acts against end 58 while fluid admitted into chamber 62 acts against end 56 and obviously the force generated by the pressure in chamber 62 and the force generated by spring 60 and the pressure acting on end 58 will determine the position of spool 54. Fuel admitted to valve 50 from line 30 is metered by the metering edge 64 on spool 54 into line 22 by way of passage 66 and minimum pressure and shutoff valve generally indicated by numeral 68.

Minimum pressure and shutoff valve 68 comprises valve member 70 urged in one direction by the spring 72. When the value of the pressure acting on the underside or the left-hand end of valve member 70 is sufficient to overcome the force exerted by spring 72 as well as the pressure in chamber 74, the valve member is unseated allowing communication between line 66 and line 22.

As noted from FIG. 3, solenoid 76 normally urges ball valve 78 so that line 80 interconnects chamber 74 with pressure $P_g$ so that this pressure and the force of spring 72 act on one end of valve member 70 opposing the force of the metered fuel discharging from line 66. Solenoid 76 may be actuated by the pilot by depressing button 81 which conducts electrical current to actuate the plungers 82 and 84. Plunger 82 in this instance would move to the right seating ball 78 against the drain line, interconnecting line 80 and line 86. This serves to direct pressure upstream of throttle valve 50 behind valve element 70 for urging this valve in the closed position for changing to the emergency engine fuel flow.

So that the displacement of valve 50 and metering edge 64 is directly proportional to the fuel passing therethrough, pressure regulator valve generally indicated by numeral 88 is employed. Valve 88 comprises a spool 90 mounted in cylinder 92 defining a pair of opposing chambers 94 and 96. Disposed in chamber 94 is adjustable spring 99. Fluid upstream and downstream of throttle valve 50 is admitted to chambers 94 and 96 through line 98, valve 100 and line 102 in one instance and line 104, ball valve 106 and lines 86 and 89 in the other instance. It will be noted from the drawing that valve 106 is seated on the left end blocking flow between drain and line 104 while admitting pressure upstream of 50 into chamber 96.

From the foregoing, it is apparent that valve member 90 is subjected to upstream and downstream pressure together with the force exerted by spring 99. This serves to position the metering portion 108 relative to orifice 110. This orifice and metering element 108 serve to bleed pressure fluid upstream of valve 50 through line 112 into line 232 and eventually back to the reservoir, bypassing the throttle valve. Thus, it is apparent that the pressure drop across throttle valve 50 is maintained at a constant value, which value is determined by the force or the strength of spring 99. In the event a deviation of the desired pressure drop is evidenced, valve element 90 will move relative to the metering edge 110 for opening or closing said valve and hence increasing or decreasing the rate of flow therethrough for regulating the pressure drop across valve 50 to hold it constant.

It will be noted that valve 100 which is connected to lever 42 and rotated thereby is normally in the open position. By rotating valve 100, fluid in line 102 is ported to drain via line 118. This decreases the pressure in chamber 94 and since the pressure acting on the other end is at a greater value, it permits the valve to move toward the right in the full open position. This bypasses the fuel around the throttle valve and directs the entire fuel back to drain. This completely starves the engine and prevents the fuel from increasing to a pressure whose valve would be above the structural integrity of the components of the fuel control. Overpressurization is occasioned by virtue of the fact that if the engine windmills by virtue of the air passing over the compressor, the fuel pump driven thereby would begin to overspeed and build up the pressure in line 30. What has just been described is the normal or main fuel regulating means of the fuel control. This fuel control may also include an emergency system comprising shutoff valve 120, emergency throttle valve 133, emergency pressure regulating valve 134 and valves 106, 78 and 137 (note, however, that valve 137 is only to shut off the emergency system).

Of course, the emergency fuel control portion is only actuated in the event that the normal fuel control becomes inoperative for one reason or another. In that event, switch 81 is actuated for energizing solenoid 76 for shifting the position of ball valves 78 and 106. This leads fluid from chamber 96 to drain via lines 104 and 83, leads fluid from chamber 140 to drain via lines 143, 104 and 83 while chamber 74 is connected with high pressure via lines 86 and 80 for directing valve member 72 to the closed position. Valve 133 is opened and is directly coupled to lever 42 for metering fluid to the engine through valve 120 and line 22. By virtue of the fact that the pressure underneath the valve element 146 is greater than both the spring force and the pressure in chamber 140, it shifts to the open position allowing the communication between valve 133 and line 22. Further, it will be appreciated that at this time valve 137 is directed to communicate line 148 to line 147 and allowing normally closed emergency pressure regulating valve 134 to open. This valve then serves to control the pressure drop across valve 133. Now that the fuel regulating system has been described, the next portion of the description will be directed to describing the computing mechanism of the fuel control.

As was mentioned above, the position of spool 54 of throttle valve 50 is positioned by the pressure of the fluid in chamber 62. This pressure is made proportional to the desired amount of fuel which will operate the engine at a scheduled value determined by the fuel computing system. The fuel computing system computes steady state and acceleration schedules as will be described hereinbelow. In accomplishing this, levers 42 and 44 are positioned in the desired position to develop the desired amount of thrust or horsepower necessary to propel the aircraft for its desired operation. Referring now to lever 42 which serves to select the predetermined speed setting of the gas generator by virtue of setting the metering area defined by orifices 130 and 132 of valve 134. This serves to set a desired area which will control the pressure in lines 136 and 138 by bleeding fluid to drain. Ignoring for the moment the valve generally indicated by numeral 140, this pressure, in turn, establishes the pressure in line 142. A pair of adjustable orifices 144 and 146 disposed in lines 136 and 138 respectively, serve to provide the idle and topping $N_g$ limits by virtue of the fact that orifice 130 is closed when lever 42 is set for topping and orifice 132 is closed when lever 42 is set for idle.

From the foregoing it is apparent that valve 134 determines a porting area for establishing a pressure in line 142 which is proportional to the desired speed of the gas generator compressor 12. In order to establish a signal to compare the desired speed with actual speed, speed sensor generally indicated by numeral 150 is employed and suitably connected to and driven by compressor 12 for rotating platform 152. The platform contains flyweights 154 and 156 which are pivotally connected to the upstanding members 158 and 160. The arms of the flyweights bear against an end of pilot valve 160. When the flyweights are disturbed from their vertical position resulting from the rotational movement of platform 152, they will either move inwardly or outwardly relative to the rotational axis for positioning valve 161. This, in turn, meters fluid from line 162 to line 142 upstream of fixed restriction 166 proportional to the square of the speed. It will be noted that the pressure in line 142 goes to chamber 163 via annular space 165 made at the lap fit between spool 161 and its cylinder and balances the flyweight force which nulls the valve 161 at the right pressure.

It is apparent from the foregoing that the pressure in line 142 downstream of orifice 166 is a function of the actual speed of the compressor and the desired speed generated by the position of lever 42. This value which is a speed error signal acts on the underside of valve 168 for positioning the metering edge 170.

From the drawing it will be apparent that compressor discharge pressure from line 38 is admitted internally of bellows 172. The free end of bellows 172 acts against pilot valve 174 which serves to regulate pressure in line 176 as a function of compressor discharge pressure. This is accomplished by metering fluid issuing from pressure supply line 173 through passages in spool 174 and into chamber 175 via lines 178. Spool 174 is counterbalanced by the pressure in chamber 175 acting on its underside. Spool 174 translates with respect to the opening 180 until the pressure in chamber 175 acting externally of bellows 172 balances the pressure and the spring acting internally thereof. At the point of equilibrium, the pressure in line 176 is established at the point where it is proportional to compressor discharge pressure plus a constant.

This pressure line 176 is then fed into pilot valve 168 which serves to meter it to line 180. By properly contouring metering edge 170, this pressure is then made a function of the desired fuel flow or $W_f$ for steady state operation. The fluid metered by metering edge 170 is then fed into selector valve 182 via branch line 184 where it is admitted to chamber 62 through line 186 when spool 188 is in the righthand position.

The position of lever 44 serves to generate a signal which will produce a value for establishing the speed at which the free turbine is desired to operate. This is accomplished by the rotation of valve 201 which establishes an area across orifices 202 and 204 venting fluid out of chamber 206 formed in valve 140. This serves to control the pressure drop across restrictor 208 for establishing the desired $N_f$. Adjustable restrictions 210 and 212 downstream of orifices 202 and 204 respectively establish the minimum and maximum speed of the free turbine. The pressure upstream of restrictor 208 is proportional to the square of the speed of the free turbine which is established by pilot valve 210. This valve operates substantially the same as valve 150 by coupling platform 213 to the free turbine shown by line 40 in FIG. 1 so that flyweights 214 responding to this speed positions pilot valve 211. This meters fluid issuing from servo supply line 216 into line 218 in such a manner as to make this pressure proportional to the free turbine speed squared. Hence, the pressure in chamber 206 is established as being the difference between the actual speed generated by pilot valve 211 and the desired speed established by the position of lever 44.

From the foregoing it is apparent that spool 220 is positioned as a function of speed error for modifying the pressure in line 142. This has the effect of resetting the position of spool 168 and hence establishing a new value for the setting of the gas generator or $N_g$. What has just been described is the steady state operation as established by the computing mechanism of the fuel control. The next portion of the description will describe the established acceleration surge and overtemperature schedule of the computing mechanism.

As noted from FIG. 3, pressure proportional to compressor discharge pressure is admitted to temperature responsive valve generally indicated by numeral 200 through line 222. The metering edge 224 formed on spool 226 is made to vary as a function of the square root of compressor inlet temperature (the subscript $t$ indicates total temperature value). Compressor inlet temperature admitted to act externally of bellows 228 through line 34 causes it to expand or contract for positioning spool 226 as a function of compressor inlet temperature. By virtue of positioning metering edge 224, the pressure drop across restrictor 230 which bleeds fluid from line 232 to drain is controlled and a multiplication is effectuated so that the pressure in line 232 is made proportional to compressor discharge pressure and a function of the square root of $\theta_{t2}$. This pressure is then admitted to valve 234 which is positioned as a function of the speed $N_g^2/\theta_{t2}$ in the manner to be described hereinbelow. Metering edge 238 of spool 240 is made to define an area which is a function of $$\frac{W_f}{P_{t3}\sqrt{\theta_{t2}}}$$

The combination of this area and the area established by fixed restrictor 242 serves to effect another multiplication so that the pressure in line 244 is made proportional to the desired fuel flow $W_f$.

The pressure in line 244 is then admitted into selector valve 246 to act on the left end of spool 248 which in this instance is the desired $W_f$ for establishing the surge limit of the schedule. The pressure acting on the right end of spool 248 is the limit in terms of $W_f$ for the temperature limiting portion of the acceleration schedule. This is established by metering lands 250 of spool 226 and 252 of spool 240 in the manner described immediately below.

Fluid pressure proportional to compressor discharge pressure evidenced in line 176 is admitted to the metering land 250 through line 256. This metering land is made a reciprocal function of $\theta_{t2}$ raised to the $x$ power which $x$ power is established according to the thermodynamics of the engine. The value may be ascertained in accordance with the mathematical computations disclosed in my U.S. application Ser. No. 337,904, filed on Jan. 15, 1964, entitled, "Fuel Control," and assigned to the same assignee. Hence, the pressure established in line 258 is a multiplication by virtue of metering edge 250 and fixed restriction 260. The area defined by metering edge 250 varies as a function of compressor discharge pressure times a function of $1/\theta_{t2}^x$. This fluid is then admitted to valve 234 where metering edge 252 in conjunction with fixed restriction 262 serves to effect another multiplication. Since the area defined by metering edge 252 is a function of $W_f/P_{t3}$ times $\theta_{t2}^x$, the pressure in line 264 is proportional to the desired fuel flow ($W_f$) for limiting temperature. It will be appreciated that the position of this valve is varied as a function of $N_g^2/\theta_{t2}$ which has been established by metering edge 251 of spool 226. It will be appreciated that pressure generated by pilot valve 161 is made proportional to $N_g^2$, which, in turn, is fed to line 142 and admitted to metering edge 251. By virtue of metering edge 251 and fixed restriction 253 a division is effectuated so that the pressure in line 255 is made proportional to $N^2/\theta_{t2}$ which, in turn, acts on the left end of spool 240.

This fluid in line 264 is then admitted to selector valve 246 to act on the right-hand end of spool 248. The difference between the two values of the pressures acting on either end of spool 248 determines the position of spool 248 to either the left or right for admitting fluid into line 266. Hence, the pressure in line 266 is either the desired $W_f$ surge or the desired $W_f$ temperature depending on the position of selector spool 248 of selector valve 246. This pressure is then admitted to act on the left end of spool 188. As mentioned above, steady state pressure proportional to the desired fuel flow ($W_f$) acts on the right-hand end. The difference between the two values will position spool 188 to either the left or right. The pressure proportional to the desired steady state $W_f$ or the desired surge $W_f$ or the desired overtemperature $W_f$ is then admitted to chamber 62 for controlling the position of spool 54 of throttle valve 50.

Since it is desirable to compute the terms of the parameters in absolute values rather than gauge pressure values, absolute pressure control 280 is employed. Fluid from the various computating valves and restrictions which is eventually ported to drain is first admitted into chamber 282 via line 284 where it acts externally of bellows 286. Bellows 286 is evacuated and has its free end operatively connected to one end of spool 288. Since the other end of spool 288 is counterbalanced by the pressure admitted thereto through line 290 metering edge 292 thereof will assume a position to establish the drain pressure for establishing an absolute value datum line. Note that the pressure level is set equal to the spring constant established in valve 171. Therefore, it will be appreciated that the datum line is equivalent to an absolute value so that the pressure control valves use a zero pressure datum rather than a gauge pressure datum.

By way of illustration, but not being limited, thereto, the compensator shown in FIG. 4 is incorporated into the above described fuel control for compensating for G load effects.

Referring now to FIG. 4 which shows the G compensator generally indicated by the numeral 400, as comprising valve casing 402 and the elongated spool member 404 disposed in a bore formed therein. Spool 404 carries a pair of opposing fluid reaction surfaces 406 and 408, one of which is subject to drain pressure ($Po$) as created by the absolute pressure regulator 280, and the other end is subjected to the G compensator pressure developed by valve 400. Land 410 disposed intermediate fluid reaction surfaces 406 and 408 serves to meter high pressure servo pressure fed into valve 400 through line 414 to generate a pressure value as a function of the G loads felt by spool 404. The metered fluid is directed to the various computing valves and throttle valve of the fuel control as indicated by the nomenclature $P_g$. Hence, when the various valves and spools are subject to G loadings, spool 404 sensing the same G loadings, moves downwardly to introduce a percentage of servo pressure into line 416 for generating a pressure proportional to the G loadings and which pressure is applied to the varous computing valves and throttle valve for producing a force which is equal and opposite to the G loadings felt by those computing valves and throttle valve. When the G loading is no longer imposed on these valves, the pressure felt by reaction surface 408 fed thereto by line 418, and the attendant decrease of force felt by spool 404, causes spool 404 to move into the opposite direction, mainly upwardly, until the pressure in line 416 is reduced until the pressure acting on 408 is equal to $Po$. When this occurs, land 410 is positioned to a null position with respect to line 416 and no flow will be evidenced in line 416. When no G forces are felt, then $P_g$ equals $Po$. Hence, the pressure referenced by the various valves will now be maintained at a constant value by the G compensator referenced to the absolute pressure regulator 280.

In mounting the valves and mechanism corrected by the G compensator, the longitudinal axis thereof should be parallel to the longitudinal axis of spool 404. Also, it will be noted that in its preferred embodiment the weight of spool 404 should be substantially identical to the weight of each of the valves and mechanisms being corrected. However, it should be appreciated that the weight may be different so long as the ratio of the area of the surface subjected to the G compensated pressure of spool 404 to the weight of the spool 404 equals the ratio of the area of the surface subjected to the G compensated pressure of the valve being corrected to the weight of said valve is equal.

It should be understood that the invention is not limited to the particular embodiments shown and described herein, but that various changes and modifications may be made without departing from the spirit or scope of this novel concept as defined by the following claims.

I claim:

1. In a hydraulic system having a drain and a source of pressure and control means for maintaining the pressure of the fluid leading to drain at a predetermined value above drain pressure, means for compensating for G loads, including valve means having a first reaction surface and a second reaction surface, first connecting means for leading fluid from said control means to said first reaction surface, said valve means having a metering element adapted to lead fluid from said source or to said drain, and second connecting means for leading fluid downstream of said metering element to said second reaction surface whereby said metering element varies when a G load is imposed on said valve means.

2. Means for compensating for G loads imposed on an element in a hydraulic system, which element is movable by the application of pressurized fluid at one of its ends, said element having a surface subjected to a reference pressure, means for maintaining the reference pressure at a constant value, a source of fluid under pressure and a drain, said compensating means including a valve member subjected to the same G loads as is on said element, said valve member having one end subjected to said referenced pressure, and said valve member having a metering element leading fluid from source to said surface when a G load is imposed on said element and leading fluid from said surface to said drain when the G load has subsided and the referenced pressure becomes greater than the value of the pressure of the fluid discharging from said metering element.

3. In a device as claimed in claim 2 wherein the longitudinal axis of said valve member is parallel to the longitudinal axis of said element.

4. In a device as claimed in claim 2 wherein the weight of said valve member is substantially the same as the weight of said element.

5. Means for compensating for G loads imposed on an element in a hydraulic system, which element is movable by the application of pressurized fluid at one of its ends, said element having a surface subjected to a reference pressure, means for maintaining the referenced pressure at a constant value, a source of fluid under pressure and a drain, said compensating means including a valve member having an axis lying parallel to the axis of said element and being subjected to the same G loads as is on said element, said valve member having one end subjected to said referenced pressure, and said valve member having a metering element leading fluid from said source to said surface when a G load is imposed on said element and leading fluid from said surface to said drain when the G load has subsided and the referenced pressure becomes greater than the value of the pressure of the fluid discharging from said metering element.

6. In a fluid system having a controlled pressurized fluid, a device for compensating for acceleration forces attendant said system for producing a fluid pressure proportional to said forces, comprising a casing having an inlet and outlet port defining a cavity portion, a slidable spool-like member in said cavity portion, said spool-like member having a metering land adjacent the outlet port, said spool-like member carrying opposing end surfaces axially spaced from the bottom and top surfaces of said cavity portion, first passage means interconnecting said cavity portion at the space between said bottom surfaces af said cavity and one of said opposing end surfaces and said outlet port, and second passage means leading controlled pressurized fluid to the space between said top surface of said cavity portion and the other opposing end surface and the controlled pressurized fluid, whereby the position of said metering land varies with respect to said outlet port when an acceleration force is exerted thereon.

7. For a hydraulic system having at least one control valve for regulating an output device, which system is subjected to G loads adversely affecting the control valve imposing an error on the output device, means for compensating for the G loads including valve means remotely mounted from said control valve, said valve means having at least one pressure reaction chamber on one end thereof and an interconnection to said control valve for leading fluid to or away from said control valve in accordance with the G load imposed on said hydraulic system.

References Cited

UNITED STATES PATENTS

| | | | |
|---|---|---|---|
| 2,795,106 | 6/1957 | Martin | 137—38 |
| 3,158,149 | 11/1964 | Gray | 137—38 |
| 3,249,145 | 5/1966 | Alberani | 137—38 |

CLARENCE R. GORDON, *Primary Examiner.*